(12) United States Patent
Shirota

(10) Patent No.: US 7,529,570 B2
(45) Date of Patent: May 5, 2009

(54) FOLDING CELLULAR PHONE

(75) Inventor: Hirobumi Shirota, Tokyo (JP)

(73) Assignee: NEC Corporation, Tokyo (JP)

( * ) Notice: Subject to any disclaimer, the term of this patent is extended or adjusted under 35 U.S.C. 154(b) by 604 days.

(21) Appl. No.: 11/102,699

(22) Filed: Apr. 11, 2005

(65) Prior Publication Data
US 2005/0233783 A1 Oct. 20, 2005

(30) Foreign Application Priority Data
Apr. 20, 2004 (JP) .............. 2004-124308

(51) Int. Cl.
H04M 1/00 (2006.01)
(52) U.S. Cl. ............... 455/575.3; 455/569.1
(58) Field of Classification Search .......... None
See application file for complete search history.

(56) References Cited

U.S. PATENT DOCUMENTS

| 5,818,924 | A | 10/1998 | King et al. | |
| 6,292,563 | B1 | 9/2001 | Clark et al. | |
| 2004/0166907 | A1* | 8/2004 | Yajima | 455/575.3 |
| 2005/0239521 | A1* | 10/2005 | Harada et al. | 455/575.3 |

FOREIGN PATENT DOCUMENTS

| CN | 1311595 | A | | 9/2001 |
| CN | 1413047 | A | | 4/2003 |
| GB | 2 381 898 | A | | 5/2003 |
| JP | 07-500230 | A | | 1/1995 |
| JP | 09-093316 | | | 4/1997 |
| JP | 09-093318 | A | | 4/1997 |
| JP | 409093316 | | * | 4/1997 |
| JP | 2002-111825 | A | | 4/2002 |
| JP | 2003-051871 | A | | 2/2003 |
| JP | 2003-087379 | A | | 3/2003 |
| JP | 2003-125047 | A | | 4/2003 |
| JP | 2003-198711 | A | | 7/2003 |
| JP | 2003-348205 | | | 12/2003 |

* cited by examiner

Primary Examiner—Thanh C Le
(74) Attorney, Agent, or Firm—Dickstein, Shapiro, LLP.

(57) ABSTRACT

A folding cellular phone capable of adjusting the output or sensitivity of its microphone based on whether or not the cellular phone is folded. A detector outputs a detection signal indicating whether or not first and second housings are in their closed positions to a controller. When the detection signal output from the detector indicates that the first and second housings are in closed positions, the controller sets the gain of a variable amplifier, which amplifies the output of a microphone, higher than that when the detection signal output from the detector does not indicate that the first and second housings are in closed positions.

9 Claims, 3 Drawing Sheets

FOLDING CELLULAR PHONE

BACKGROUND OF THE INVENTION

Voice communication is essential to users of cellular phones. With the widespread use of cellular phones, their potential and applicability are increasingly broadened. Besides, there have been proposed cellular phones in a variety of styles, which offer various modes available according to the needs or preferences of users due to competition in the cellular phone market.

For example, in Japanese Patent Application laid open No. 2003-348205, there is described a folding cellular phone provided with two speakers, one above and the other below a display, one of which is selectively activated depending on whether the phone is folded or unfolded.

The patent application, however, does not disclose or suggest any specific construction for increasing the sensitivity of a microphone when the folding cellular phone is folded.

SUMMARY OF THE INVENTION

It is therefore an object of the present invention to provide a folding cellular phone capable of adjusting the output or sensitivity of the microphone based on whether or not the cellular phone is folded.

In accordance with an aspect of the present invention, to achieve the object mentioned above, there is provided a folding cellular phone having a first housing and a second housing that is foldably or hingedly connected to the first housing. the folding cellular phone comprises: a microphone mounted on the second housing; a variable amplifier for amplifying audio signals output from the microphone to modulate the volume; a detector for outputting a detection signal indicating whether or not the first and second housings are in closed (folded) positions; and a controller for controlling the gain or amplification of the variable amplifier based on the detection signal output from the detector.

By virtue of this construction, the gain of the variable amplifier is controlled based on whether or not the first and second housings are in their closed positions. Consequently, the gain of the variable amplifier can be changed depending on whether the folding cellular phone is folded or unfolded. Thus, it is possible to properly control the output or sensitivity of a microphone.

Preferably, when the detection signal output from the detector indicates that the first and second housings are in closed positions, the controller sets the gain of the variable amplifier higher than that when the detection signal does not indicate that the first and second housings are in closed positions.

By virtue of this construction, the output or sensitivity of the microphone can be increased when the first and second housings are in their folded positions as compared to when the first and second housings are in their unfolded positions. Thus, even when the folding cellular phone is folded, the microphone can pick up sounds and voices well.

Preferably, the first housing has a notch in a position opposite to the microphone when the first and second housings are in closed positions.

By virtue of this construction, the microphone can pick up sounds and voices well even when the first and second housings are in closed positions.

Preferably, the folding cellular phone further comprises an input section by which a user provides input indicating a call start instruction, wherein, when the call start instruction is input through the input section, the controller determines that a call exists and changes the gain of the variable amplifier based on the detection signal output from the detector.

By virtue of this construction, the gain of the variable amplifier is changed only when the microphone is in use. Therefore, it is avoided to perform the operation for changing the gain of the variable amplifier, which is hardly necessary if the microphone is not in use.

Preferably, the first housing includes thereon a first speaker and a second speaker that is arranged closer to the second housing than the first speaker when the first and second housings are in their open or spread positions, wherein, when the detection signal output from the detector indicates that the first and second housings are in closed positions, the controller activates the second speaker and deactivates the first speaker, while when the detection signal output from the detector does not indicate that the first and second housings are in closed positions, the controller activates the first speaker and deactivates the second speaker.

By virtue of this construction, the output levels (sensitivity) of the speaker and microphone actually utilized are changed according to the open/close operation of the first and second housings. Thus, the output levels of the speaker and microphone can be set so as to suit for the positions of the first and second housings.

Preferably, the folding cellular phone further comprises a received sound variable amplifier for amplifying audio signals received from the other party to modulate the volume and a loudspeaker for outputting sound or voice corresponding to the audio signals amplified by the received sound variable amplifier, wherein, when the detection signal output from the detector indicates that the first and second housings are in closed positions, the controller sets the gain of the received sound variable amplifier higher than that when the detection signal does not indicate that the first and second housings are in closed positions.

By virtue of this construction, the volume of the loudspeaker can be controlled properly according to the open/close operation of the first and second housings.

Preferably, the folding cellular phone further comprises a switch by which a user provides input indicating designation information for designating a conversation through either one of the first and second speakers and the microphone, or a conversation through the loudspeaker and the microphone, wherein, when the designation information for designating a conversation through either one of the first and second speakers and the microphone is input through the switch, the controller activates the first or second speaker and the microphone as well as deactivating the loudspeaker, while when the designation information for designating a conversation through the loudspeaker and the microphone is input through the switch, the controller activates the loudspeaker and the microphone as well as deactivating the first and second speakers.

By virtue of this construction, the user can select either one of the first and second speakers, or the loudspeaker for use.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

Figure 1:
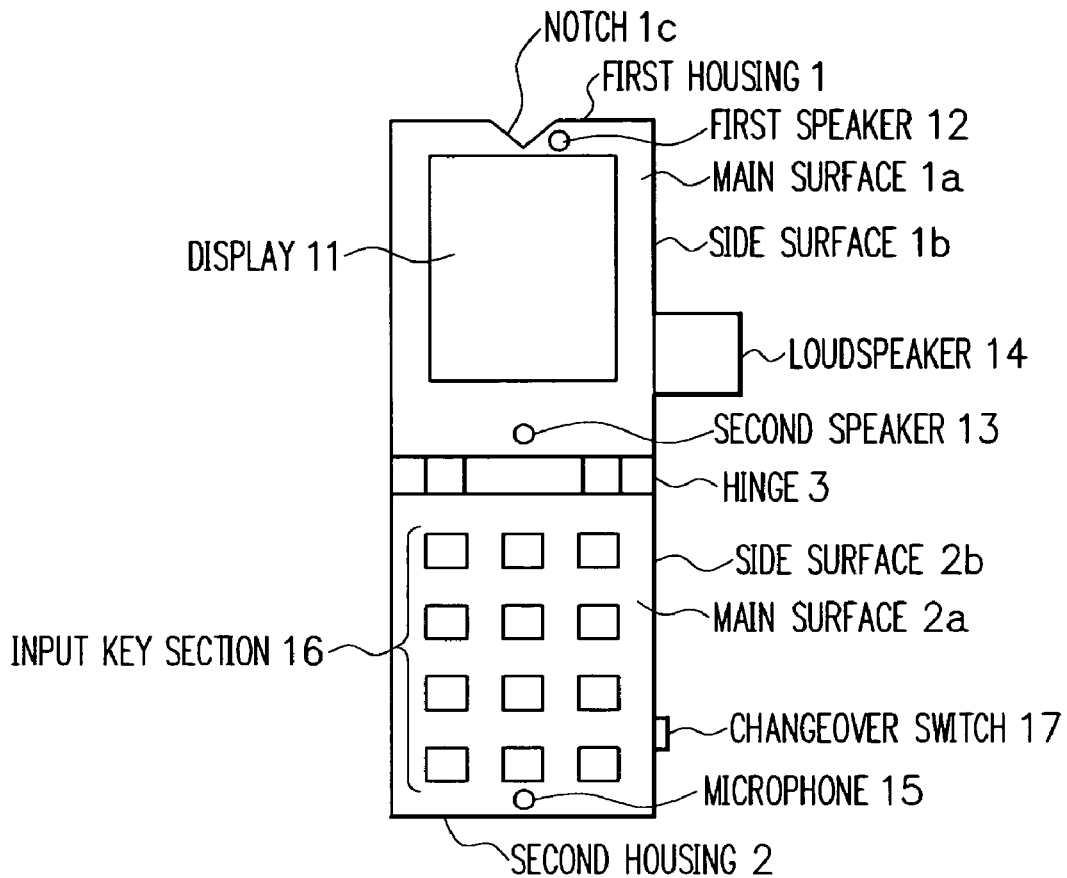
FIG. 1 is a diagram showing the plan view of a folding cellular phone in open position according to an embodiment of the present invention.

Referring now to the drawings, a description of a preferred embodiment of the present invention will be given in detail.

FIG. 1 is a diagram showing the plan view of a folding cellular phone in open (spread) position according to an embodiment of the present invention.

As can be seen in FIG. 1, the folding cellular phone comprises a first housing 1, a second housing 2 and a hinge 3. The first and second housings 1 and 2 are rotatable on the hinge 3 as a rotation axis. Besides, the first housing 1 is also rotatable on an axis perpendicular to the hinge 3 (not shown) as a rotation axis.

The first housing 1 is provided on its main surface 1a with a display 11, a first speaker 12, and a second speaker 13. Compared to the first speaker 12, the second speaker 13 is arranged on the side of the main surface 1a near the second housing 2 when the first and second housings 1 and 2 are in their open (spread) positions, that is, the folding cellular phone is unfolded. In addition, the first housing 1 is provided on its side surface 1b with a loudspeaker 14, which can slide in and out of the first housing 1. In FIG. 1, the loudspeaker 14 appeases outside the first housing 1.

The second housing 2 is provided on its main surface 2a with a microphone 15 and an input key section 16. Further, the second housing 2 is provided on its side surface 2b with a changeover switch 17.

Besides, the first housing 1 has a notch 1c in a position opposite to the microphone 15 when the first and second housings 1 and 2 are in their closed positions, that is, the folding cellular phone is folded.

Figure 2:
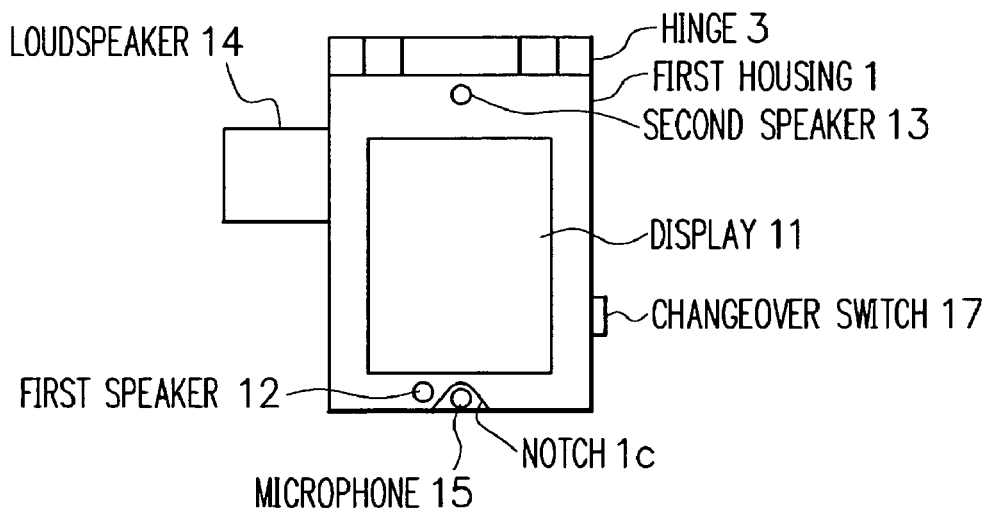
FIG. 2 is a diagram showing the plan view of the folding cellular phone depicted in FIG. 1 in closed position.

FIG. 2 shows the plan view of the folding cellular phone depicted in FIG. 1 in closed (folded) position. In FIG. 2, the folding cellular phone is folded so that the display 11 is exposed while the input key section 16 is hidden inside.

Figure 3:
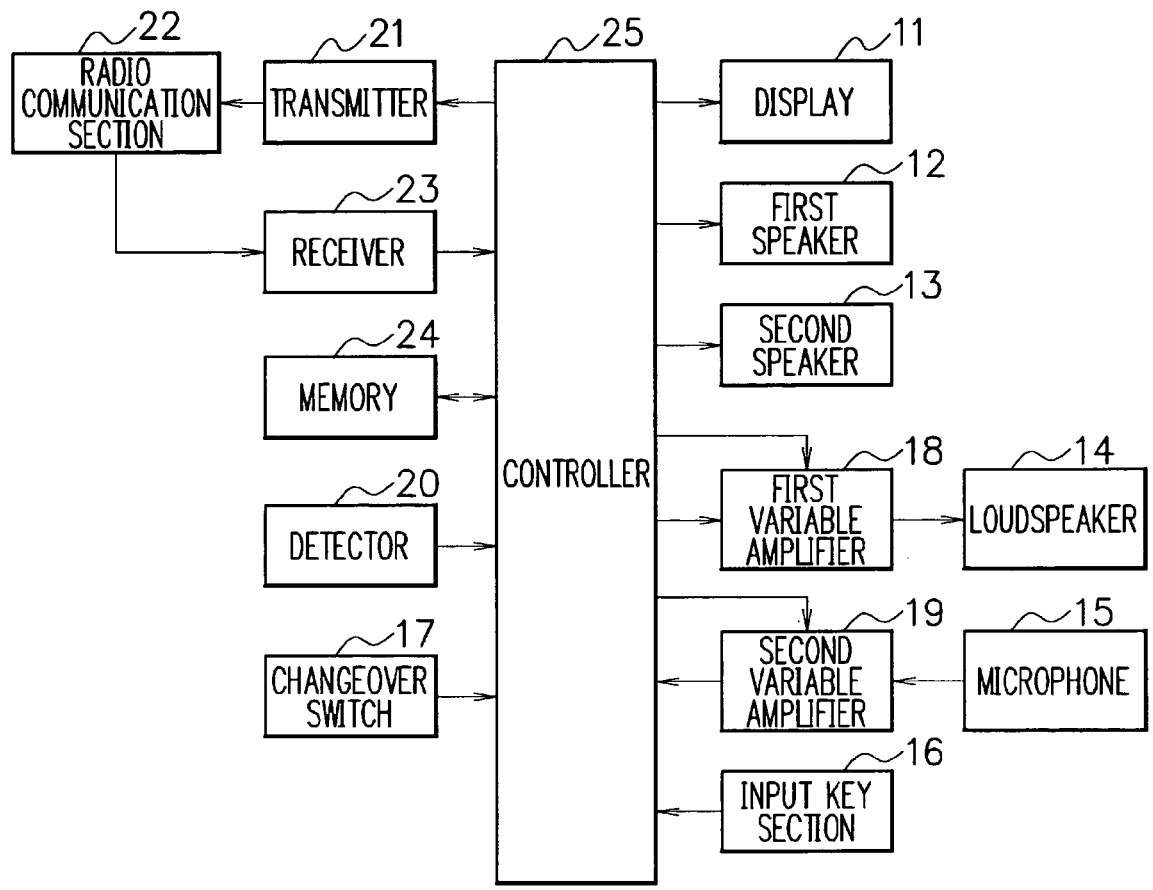
FIG. 3 is a block diagram showing an example of the construction of the folding cellular phone depicted in FIG. 1.

FIG. 3 is a block diagram showing an example of the construction of the folding cellular phone depicted in FIG. 1. Incidentally, like reference numerals refer to like portions throughout the drawings.

In addition to the display 11, the first speaker 12, the second speaker 13, the loudspeaker 14, the microphone 15, the input key section 16, and the changeover switch 17, the folding cellular phone further comprises, as shown in FIG. 3, a first variable amplifier 18, a second variable amplifier 19, a detector 20, a transmitter 21, a radio communication section 22, a receiver 23, a memory 24, and a controller 25.

The display 11 displays various types of information under the control of the controller 25.

The first and second speakers 12 and 13 output the voice of the other party under the control of the controller 25. The loudspeaker 14 outputs the voice of the other party or sound at a higher volume compared to that output from the first or second speaker 12 or 13 under the control of the controller 25.

The microphone 15 inputs the voice of the user, and feeds the second variable amplifier 19 with audio signals corresponding to the voice input therein. The second variable amplifier 19 amplifies the audio signals from the microphone 15 to modulate the volume. The gain or amplification of the second variable amplifier 19 is controlled by the controller 25.

The input key section 16 is used by the user to operate the folding cellular phone. The user provides via the input key section 16 various types of inputs, such as call start and end instructions (on/off hook operation).

The changeover switch 17 is used by the user to select first designation information for designating a conversation through either one of the first and second speakers 12 and 13 and the microphone 15, or second designation information for designating a conversation through the loudspeaker 14 and the microphone 15.

The first variable amplifier 18 amplifies the audio signals from the controller 25 to modulate the volume, and feeds the loudspeaker 14 with the audio signals thereby amplified. The gain or amplification of the first variable amplifier 18 is controlled by the controller 25.

The detector 20 detects whether the first and second housings 1 and 2 are in their open or closed positions: the folding cellular phone is folded or unfolded. More specifically, the detector 20 sends the controller 25 a detection signal indicating whether the first and second housings 1 and 2 are in open or closed positions.

The transmitter 21 transmits various types of information through the radio communication section 22 such as an antenna. The transmitter 21 transmits, for example, audio signals corresponding to the voice of the user input to the microphone 15 through the radio communication section 22.

The receiver 23 receives various types of information through the radio communication section 22. The receiver 23 receives, for example, audio signals sent from the other party through the radio communication section 22, and feeds the controller 25 with the audio signals. The controller 25 supplies the audio signals from the receiver 23 to the first and second speakers 12 and 13, and the loudspeaker 14. Each of the first and second speakers 12 and 13, and the loudspeaker 14 outputs the voice or sound corresponding to the audio signals from the controller 25.

The memory 24 is a machine-readable storage medium. The memory 24 stores a program that defines the operation of the folding cellular phone.

The controller 25 is a computer. The controller 25 reads the program stored in the memory 24 and executes it to perform various types of operations.

For example, the controller 25 controls the gain or amplification of the second variable amplifier 19 based on the detection signal output from the detector 20. More specifically, the controller 25 sets the gain of the second variable amplifier 19 higher when the detection signal output from the detector 20 indicates that the first and second housings 1 and 2 are in closed positions (see FIG. 2) as compared to when it does not (see FIG. 1).

Preferably, the controller 25 detects that a call has been established or that a call exists according to input indicating a call start instruction provided through the input key section 16, which enables the user to start a conversation. Having detected the existence of a call, the controller 25 changes the gain of the second variable amplifier 19 based on the detection signal output from the detector 20.

Additionally, when the detection signal output from the detector 20 indicates that the first and second housings 1 and 2 are in closed positions, the controller 25 activates the second speaker 13 and deactivates the first speaker 12. For example, when the detection signal output from the detector 20 indicates that the first and second housings 1 and 2 are in closed positions, the controller 25 may supply audio signals fed from the receiver 23 to the second speaker 13 only but not to the first speaker 12.

On the other hand, when the detection signal output from the detector 20 does not indicate that the first and second housings 1 and 2 are in closed positions (the folding cellular phone is unfolded), the controller 25 activates the first speaker 12 and deactivates the second speaker 13. For example, when the detection signal output from the detector 20 does not indicate that the first and second housings 1 and 2 are in closed positions, the controller 25 may supply audio signals fed from the receiver 23 to the first speaker 12 only but not to the second speaker 13.

The controller 25 also sets the gain of the first variable amplifier 18 higher when the detection signal output from the detector 20 indicates that the first and second housings 1 and 2 are in closed positions as compared to when it does not.

Besides, when the first designation information is selected with the changeover switch 17, the controller 25 activates either one of the first and second speakers 12 and 13 and the microphone 15 as well as deactivating the loudspeaker 14. As is described above, the first designation information refers to information for designating a conversation through either one of the first and second speakers 12 and 13 and the microphone 15.

For example, when the first designation information is selected with the changeover switch 17, the controller 25 may supply audio signals fed from the receiver 23 to only the first speaker 12 or the second speaker 13 selected based on the detection signal output from the detector 20, and receive the output of the microphone 15 via the second variable amplifier 19.

On the other hand, when the second designation information is selected with the changeover switch 17, the controller 25 activates the loudspeaker 14 and the microphone 15 as well as deactivating the first and second speakers 12 and 13. As is previously described, the second designation information refers to information for designating a conversation through the loudspeaker 14 and the microphone 15.

For example, when the second designation information is selected with the changeover switch 17, the controller 25 may supply audio signals fed from the receiver 23 to the loudspeaker 14 only but not to the first speaker 12 and the second speaker 13, and receive the output of the microphone 15 via the second variable amplifier 19.

Figure 4:
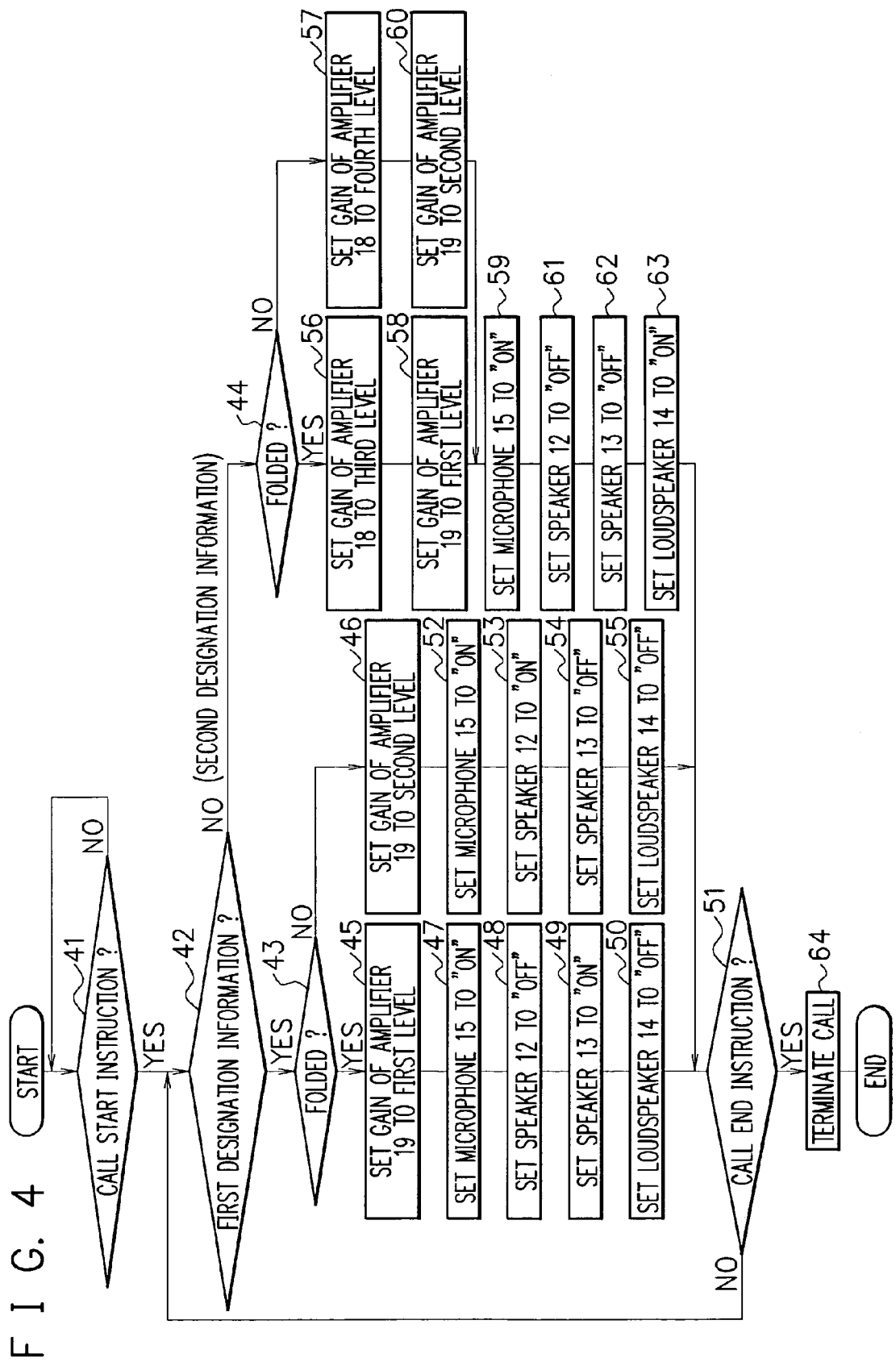
FIG. 4 is a flowchart showing the operation of the folding cellular phone depicted in FIG. 3.

FIG. 4 is a flowchart showing the operation of the folding cellular phone depicted in FIG. 3.

In the following, a description will be given of the operation of the folding cellular phone according to the embodiment of the present invention referring to FIG. 4.

First, when the user provides input indicating a call start instruction through the input key section 16, for example, when the receiver 23 has received an incoming call (step 41, Yes), the input key section 16 informs the controller 25 of the call start instruction. Incidentally, the input may be provided by the depression of an off-hook key or button (not shown) in the input key section 16. Having been informed of the call start instruction by the input key section 16, the controller 25 is fed with audio signals the receiver 23 has received from the other party. Thus, the controller 25 determines that a call exists, that is, the user is to have a conversation on the phone.

Subsequently, the controller 25 determines whether the first designation information or the second designation information has been provided from the changeover switch 17 (step 42).

When provided with the first designation information from the changeover switch 17 (step 42, Yes), the controller 25 checks a detection signal output from the detector 20. To put it more concretely, the controller 25 checks a detection signal from the detector 20 to determine whether or not the first and second housings 1 and 2 are in their closed positions: whether or not the folding cellular phone is folded (step 43). When provided with the second designation information from the changeover switch 17 (step 42, No), the process proceeds to step 44.

If the detection signal output from the detector 20 indicates that the first and second housings 1 and 2 are in closed positions (step 43, Yes), the controller 25 sets the gain of the second variable amplifier 19 to the first level (step 45). If not (step 43, No), the process proceeds to step 46.

Having completed the process in step 45, the controller 25 activates the microphone 15 to thereby receive the output of the microphone 15, which has been amplified by the second variable amplifier 19 (step 47).

After that, the controller 25 deactivates the first speaker 12 (step 48). In other words, the controller 25 does not supply the first speaker 12 with the audio signals the receiver 23 has received from the other party.

Meanwhile, the controller 25 activates the second speaker 13 (step 49). In other words, the controller 25 supplies the second speaker 13 with the audio signals the receiver 23 has received from the other party.

Further, the controller 25 deactivates the loudspeaker 14 (step 50). In other words, the controller 25 does not supply the loudspeaker 14 with the audio signals the receiver 23 has received from the other party.

With the process from step 48 through 50, when the changeover switch 17 outputs the first designation information and the folding cellular phone is folded (see FIG. 2), the voice of the other party is output form the second speaker 13 only but not from the first speaker 12 and the loudspeaker 14. Consequently, the user talks on the folding cellular phone with the second speaker 13 of the phone in closed position, as shown in FIG. 2, to his/her ear. After the completion of step 50, the process proceeds to step 51.

On the other hand, when the first and second housings 1 and 2 are not in closed positions (step 43, No), the controller 25 sets the gain of the second variable amplifier 19 to the second level that is lower than the first level (step 46).

Having completed the process in step 46, the controller 25 activates the microphone 15 to thereby receive the output of the microphone 15, which has been amplified by the second variable amplifier 19 (step 52).

In this embodiment, the gain of the second variable amplifier 19 is set higher when the detection signal output from the detector 20 indicates that the first and second housings 1 and 2 are in their closed positions as compared to when it does not. That is, when the folding cellular phone is folded and the user cannot hold the microphone 15 close to his/her mouth, the gain of the second variable amplifier 19, which amplifies the output of the microphone 15, is set higher than that when the folding cellular phone is unfolded. Thus, the microphone 15 can pick up sounds and voices well.

After that, the controller 25 activates the first speaker 12 (step 53). In other words, the controller 25 supplies the first speaker 12 with the audio signals the receiver 23 has received from the other party.

Meanwhile, the controller 25 deactivates the second speaker 13 (step 54). In other words, the controller 25 does not supply the second speaker 13 with the audio signals the receiver 23 has received from the other party.

Further, the controller 25 deactivates the loudspeaker 14 (step 55). In other words, the controller 25 does not supply the loudspeaker 14 with the audio signals the receiver 23 has received from the other party. After the completion of step 55, the process proceeds to step 51.

When provided with the second designation information from the changeover switch 17 (step 42, No), the controller 25 checks a detection signal output from the detector 20. To put it more concretely, the controller 25 checks a detection signal from the detector 20 to determine whether or not the first and second housings 1 and 2 are in closed positions: whether or not the folding cellular phone is folded (step 44).

If the detection signal output from the detector 20 indicates that the first and second housings 1 and 2 are in closed positions (step 44, Yes), the controller 25 sets the gain of the first variable amplifier 18 to the third level (step 56). If not (step 44, No), the controller 25 sets the gain of the first variable amplifier 18 to the fourth level that is lower than the third level (step 57).

After the process in step 56, the controller 25 sets the gain of the second variable amplifier 19 to the first level (step 58). Incidentally, the first level applied by the controller 25 in step 58 is identical with that applied in step 45.

On the other hand, after the process in step 57, the controller 25 sets the gain of the second variable amplifier 19 to the second level (step 60). In this connection, the second level applied by the controller 25 in step 60 is identical with that applied in step 46.

Having completed the process in step 58 or 60, the controller 25 activates the microphone 15 to thereby receive the output of the microphone 15, which has been amplified by the second variable amplifier 19 (step 59).

After that, the controller 25 deactivates the first speaker 12 (step 61). In other words, the controller 25 does not supply the first speaker 12 with the audio signals the receiver 23 has received from the other party.

In addition, the controller 25 deactivates the second speaker 13 (step 62). In other words, the controller 25 does not supply the second speaker 13 with the audio signals the receiver 23 has received from the other party.

Meanwhile, the controller 25 activates the loudspeaker 14 (step 63). In other words, the controller 25 supplies the loudspeaker 14 with the audio signals the receiver 23 has received from the other party via the first variable amplifier 18. After the completion of step 63, the process proceeds to step 51.

In the case where the first and second housings 1 and 2 are in their folded positions, the gain of the first variable amplifier 18, which supplies audio signals to the loudspeaker 14, is set higher than that when the housings 1 and 2 are in their unfolded positions. Thereby, it is possible to prevent the output sound or voice of the loudspeaker 14 from becoming less audible when the folding cellular phone is folded.

Moreover, the gain of the second variable amplifier 19 is set higher when the detection signal output from the detector 20 indicates that the first and second housings 1 and 2 are in closed positions as compared to when it does not. Thus, even when the folding cellular phone is folded and the user cannot hold the microphone 15 in the vicinity of his/her mouth, the microphone 15 can pick up sounds and voices well.

In this embodiment, the volume of the loudspeaker 14 and the sensitivity of the microphone 15 are adjusted depending on whether or not the first and second housings 1 and 2 are in their closed positions. Therefore, it is possible to reduce the possibility that the user may have difficulty in talking on the phone.

Thereafter, the controller 25 determines whether or not the user has provided input indicating a call end instruction through the input key section 16, and also the input key section 16 has informed the controller 25 of the call end instruction (step 51). Incidentally, the input may be provided by the depression of an on-hook key or button (not shown) in the input key section 16. When the controller 25 has not been informed of a call end instruction by the input key section 16 (step 51, No), the process returns to step 42.

When the controller 25 has been informed of a call end instruction by the input key section 16 (step 51, Yes), the controller 25 deactivates the microphone 15, the first and second speakers 12 and 13, and the loudspeaker 14. Then the controller 25 terminates the call, thereby completing the operation (step 64). For example, the controller 25 sets the second variable amplifier 19 to off and supplies none of the first and second speakers 12 and 13 and the loudspeaker 14 with audio signals as well as terminating communication on the cellular phone through the transmitter 21, radio communication section 22 and receiver 23.

As is described above, according to the embodiment of the present invention, the gain or amplification of the second variable amplifier 19, which amplifies the output of the microphone 15, is controlled based on whether or not the first and second housings 1 and 2 are in their closed positions: whether or not the folding cellular phone is folded. That is, the gain of the second variable amplifier 19 is changed depending on whether or not the first and second housings 1 and 2 are in closed positions so that the sensitivity of the microphone 15 can be controlled properly.

When, for example, the detection signal output from the detector 20 indicates that the first and second housings 1 and 2 are in their closed positions, the controller 25 sets the gain of the second variable amplifier 19 higher than that when the detection signal from the detector 20 does not indicate that the first and second housings 1 and 2 are in closed positions. Thereby, the sensitivity of the microphone 15 can be increased when the folding cellular phone is folded as compared to when the phone is unfolded. Thus, even when the folding cellular phone is folded, the microphone 15 can pick up sounds and voices well.

Besides, because of the notch 1c provided to the first housing 1, the microphone 15 can pick up sounds and voices well even when the first and second housings 1 and 2 are in closed positions.

Additionally, the gain of the second variable amplifier 19 is changed during a call or a conversation on the cellular phone only. Therefore, when the user is not talking on the cellular phone, it is avoided to perform the operation for changing the gain of the second variable amplifier 19, which is hardly necessary if the microphone 15 is not in use.

Further, the sensitivity of the speaker and microphone actually utilized is changed according to the open/close operation of the first and second housings 1 and 2. Thus, the sensitivity of the speaker and microphone can be set so as to suit for the positions of the first and second housings 1 and 2.

Still further, the gain of the first variable amplifier 18 for adjusting the volume of the loudspeaker 14 can be controlled properly according to the open/close operation of the first and second housings 1 and 2.

Furthermore, with the changeover switch 17, the user can select either one of the first and second speakers 12 and 13, or the loudspeaker 14 for use.

Incidentally, in the embodiment described above, the folding cellular phone may be constructed without the loudspeaker 14, changeover switch 17 and first variable amplifier 18. In this case, in the operation shown in FIG. 4, after a call start instruction is input in step 41, the controller 25 may skip step 42 and directly perform the process in step 43. Also, having completed the process in step 49 or 54, the controller 25 may directly perform the process in step 51.

In addition, the folding cellular phone of the present invention may have a construction in which the first housing 1 and the second housing 2 are oppositely arranged and rotatable on an axis perpendicular to the opposed surfaces of them.

As set forth hereinabove, in accordance with the present invention, the gain of a variable amplifier is controlled based on whether or not first and second housings are in their closed positions. Thereby, the gain of the variable amplifier can be changed depending on whether the folding cellular phone is folded or unfolded. Thus, it is possible to properly control the output or sensitivity of a microphone.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. A folding cellular phone having a first housing and a second housing that is foldably connected to the first housing, the folding cellular phone comprising:
   a microphone mounted on the second housing;
   a variable amplifier for amplifying audio signals output from the microphone to modulate the volume;
   a detector for outputting a detection signal indicating whether or not the first and second housings are in closed positions; and
   a controller for controlling the gain of the variable amplifier based on the detection signal output from the detector;
   wherein, when the detection signal output from the detector indicates that the first and second housings are in closed positions, the controller sets the gain of the variable amplifier higher than that when the detection signal does not indicate that the first and second housings are in closed positions; and
   wherein the first housing has a notch in a position opposite to the microphone when the first and second housings are in closed positions.

2. The folding cellular phone claimed in claim 1, further comprising an input section by which a user provides input indicating a call start instruction, wherein:
   when the call start instruction is input through the input section, the controller determines that a call exists, and changes the gain of the variable amplifier based on the detection signal output from the detector.

3. The folding cellular phone claimed in claim 1, further comprising:
   a received sound variable amplifier for amplifying audio signals received from the other party to modulate the volume; and
   a loudspeaker for outputting sound corresponding to the audio signals amplified by the received sound variable amplifier, wherein;
   when the detection signal output from the detector indicates that the first and second housings are in closed positions, the controller sets the gain of the received sound variable amplifier higher than that when the detection signal does not indicate that the first and second housings are in closed positions.

4. The folding cellular phone claimed in claim 3, further comprising a switch by which a user provides input indicating designation information for designating a conversation through either one of the first and second speakers and the microphone, or a conversation through the loudspeaker and the microphone, wherein:
   when the designation information for designating a conversation through either one of the first and second speakers and the microphone is input through the switch, the controller activates the first or second speaker and the microphone as well as deactivating the loudspeaker; and
   when the designation information for designating a conversation through the loudspeaker and the microphone is input through the switch, the controller activates the loudspeaker and the microphone as well as deactivating the first and second speakers.

5. A folding cellular phone having a first housing and a second housing that is foldably connected to the first housing, the folding cellular phone comprising:
   a microphone mounted on the second housing;
   a variable amplifier for amplifying audio signals output from the microphone to modulate the volume;
   a detector for outputting a detection signal indicating whether or not the first and second housings are in closed positions;
   a controller for controlling the gain of the variable amplifier based on the detection signal output from the detector; and
   an input section by which a user provides input indicating a call start instruction, wherein:
   when the call start instruction is input through the input section, the controller determines that a call exists, and changes the gain of the variable amplifier based on the detection signal output from the detector;
   wherein, when the detection signal output from the detector indicates that the first and second housings are in closed positions, the controller sets the gain of the variable amplifier higher than that when the detection signal does not indicate that the first and second housings are in closed positions.

6. The folding cellular phone claimed in claim 5, wherein:
   the first housing includes:
   a first speaker; and
   a second speaker that is arranged closer to the second housing than the first speaker when the first and second housings are in open positions; and
   when the detection signal output from the detector indicates that the first and second housings are in closed positions, the controller activates the second speaker and deactivates the first speaker; and
   when the detection signal output from the detector does not indicate that the first and second housings are in closed positions, the controller activates the first speaker and deactivates the second speaker.

7. The folding cellular phone claimed in claim 5, further comprising:
   a received sound variable amplifier for amplifying audio signals received from the other party to modulate the volume; and
   a loudspeaker for outputting sound corresponding to the audio signals amplified by the received sound variable amplifier, wherein;
   when the detection signal output from the detector indicates that the first and second housings are in closed positions, the controller sets the gain of the received sound variable amplifier higher than that when the detection signal does not indicate that the first and second housings are in closed positions.

8. A folding cellular phone having a first housing and a second housing that is foldably connected to the first housing, the folding cellular phone comprising:
   a microphone mounted on the second housing;
   a variable amplifier for amplifying audio signals output from the microphone to modulate the volume;

a detector for outputting a detection signal indicating whether or not the first and second housings are in closed positions; and a controller for controlling the gain of the variable amplifier based on the detection signal output from the detector;

wherein, when the detection signal output from the detector indicates that the first and second housings are in closed positions, the controller sets the gain of the variable amplifier higher than that when the detection signal does not indicate that the first and second housings are in closed positions wherein the first housing includes:

a first speaker; and a second speaker that is arranged in a position closer to the second housing as compared to the first speaker when the first and second housings are in open positions; and when the detection signal output from the detector indicates that the first and second housings are in closed positions, the controller activates the second speaker and deactivates the first speaker; and when the detection signal output from the detector does not indicate that the first and second housings are in closed positions, the controller activates the first speaker and deactivates the second speaker.

9. The folding cellular phone claimed in claim 8, further comprising:

a received sound variable amplifier for amplifying audio signals received from the other party to modulate the volume; and a loudspeaker for outputting sound corresponding to the audio signals amplified by the received sound variable amplifier, wherein;

when the detection signal output from the detector indicates that the first and second housings are in closed positions, the controller sets the gain of the received sound variable amplifier higher than that when the detection signal does not indicate that the first and second housings are in closed positions.

* * * * *